United States Patent [19]

Takase et al.

[11] 3,962,389

[45] June 8, 1976

[54] METHOD FOR PRODUCING CERAMICS FROM PARTICLE SHEET MATERIAL USING CATIONIC PULP

[75] Inventors: Akira Takase; Mitsuo Suzuki; Yoichi Shiraki, all of Tokyo; Katsunori Horachi, Urawa; Masao Anzai, Funabashi, all of Japan

[73] Assignee: Toppan Printing Co., Ltd., Tokyo, Japan

[22] Filed: Dec. 26, 1973

[21] Appl. No.: 427,633

[30] Foreign Application Priority Data

| Dec. 28, 1972 | Japan | 48-1821 |
| Dec. 28, 1972 | Japan | 48-1822 |
| Dec. 28, 1972 | Japan | 48-1823 |
| Dec. 28, 1972 | Japan | 48-2870[U] |
| Dec. 28, 1972 | Japan | 48-2871[U] |
| Feb. 3, 1973 | Japan | 48-14122 |

[52] U.S. Cl. ................................ 264/56; 106/69; 106/204; 264/63; 264/125
[51] Int. Cl. .......................................... C04b 35/64
[58] Field of Search ............... 264/63, 59, 56, 125, 264/60; 106/190, 204, 69

[56] References Cited
UNITED STATES PATENTS

| 2,599,092 | 6/1952 | Craig | 106/204 |
| 2,736,080 | 2/1956 | Walker et al. | 264/59 |
| 2,823,997 | 2/1958 | Craig | 106/204 |

*Primary Examiner*—Donald J. Arnold
*Assistant Examiner*—John Parrish
*Attorney, Agent, or Firm*—Lerner, David, Littenberg & Samuel

[57] ABSTRACT

Method for producing ceramics such as pottery, tiles, bricks and refractory materials which comprises the steps of: mixing in water inorganic fine particles having a negative $\zeta$-potential in water and cationic cellulose pulp having a $\zeta$-potential of +20 mV or higher; then forming a particle sheet material from said mixture in water using a sheet forming machine; firing said particle sheet material in an oxidizing atmosphere to burn off the cellulose pulp component in said sheet material; and firing further said particle sheet material to sinter the remaining inorganic fine particles. The use of said cationic cellulose pulp eliminated the need of synthetic polymer binders for inorganic fine particles.

9 Claims, No Drawings

METHOD FOR PRODUCING CERAMICS FROM PARTICLE SHEET MATERIAL USING CATIONIC PULP

BACKGROUND OF THE INVENTION

This invention relates to ceramics made from particle sheet material using cationic pulp and a method for producing the same. More particularly, the invention relates to the method for producing said ceramics in which fine particles and cellulose pulp are mixed and suspended in water, then a paper-like sheet material containing a large amount of inorganic sinterable material is formed from said suspension by using a sheet forming machine, and said sheet material is fired to form ceramics of the invention.

In the conventional art, many a method for producing paper-like sheet materials from fine powder of inorganic material and fibrous material such as pulp has been proposed. The paper-like sheet materials made through the prior art, however, usually contain very little amount of the inorganic material, so that it can not be used for producing ceramics by firing them. While, if a sufficient amount of inorganic material is to be contained in the sheet material for firing, a large amount of binder such as elastomer or latex is necessary to bind integrally the inorganic material and the fibrous material such as pulp. Nevertheless, when organic binders such as elastomer and latex in large amounts are used, the sintering between every particle of the sinterable inorganic material is prevented owing to the existence of said binder. Accordingly, it is very difficult to produce ceramics such as tiles from the sheet material using a binder such as said elastomer or latex.

BRIEF SUMMARY OF THE INVENTION

Accordingly, the principal object of the present invention is to propose a novel paper-like sheet material which contains a larger amount of inorganic sinterable material sufficient for firing.

The second object of the present invention is to propose a method for producing ceramics comprising the steps of forming ceramic greensheet materials which do not contain at all organic binders such as elastomer and latex, fixatives and polymeric coagulating agents, and firing said ceramic greensheet materials.

The third object of the present invention is to propose a method for producing large size ceramic plates by forming paper-like sheet materials which contain large amounts of sinterable inorganic materials through a sheet forming machine, and firing said sheet materials in a single layer or laminated form.

The fourth object of the present invention is to propose a method for producing ceramics such as pottery, refractories, glazed ceramics and so forth by selecting the kinds, components and composition of said inorganic materials and the temperature of firing.

The fifth object of the present invention is to propose a method for producing corrugated ceramic plates by giving wavelike configuration to wet sheet materials which is made by a sheet forming machine.

The last object of the present invention is to propose a method for producing particle sheet materials which is shapable and contains large amounts of inorganic fine particles, where said method comprises the steps of graftcopolymerizing cationic monomer to cellulose pulp to obtain cationic pulp, causing said cationic pulp to adsorb and coagulate the inorganic particles which having a negative interfacial electrokinetic potential in water, and forming the particle sheet material therefrom by using a sheet forming machine.

DETAILED DESCRIPTION OF THE INVENTION

It is well known from the past that the interfacial electrokinetic potentials (hereinafter referred to as "$\zeta$-potential") of cellulose pulp fibers and most of other fine particles are negative in water, so that aluminum sulfate, polyethylene imine, cationic starch and latex which having cationic property in water, and several polymeric coagulating agents which having good coagulating properties and effects for improving the strength of sheet material, are employed as the retention aids for fine particles. However, for example, when more than 50 percent by weight of particles must be fixed to some substrate, said retention aids are not always satisfactory in view of the effect and workability. Further, in the prior art, the mechanism of adsorbing fine particles to the interface of fibrous material comprises two steps, that is, coagulating the inorganic fine particles to giant particles by aluminum sulfate, and fixing the latter particles to the fibrous substrate. When the addition amount of the polymeric coagulating agent is increased in this process in order to improve the fixing ratio, still larger flocks are produced, and the texture of the sheet becomes inferior due to the formation of clouds. As a matter of fact, when the particle sheet material produced through the above prior method is observed by a scanning electron microscope, it is found that the fine particles from nodular groups, and the fine particles in the form of giant particles of giant groups are fixed to very limited portions of the network of cellulose pulp fibers. And this fact makes the sintering of particles still worse in the firing of the particle sheet material.

In the method of the present invention, a particle sheet material comprising cellulose pulp as the substrate and a large amount of inorganic fine particles is used. More particularly, the particle sheet material consisting of 50 to 98 percent by weight of said inorganic particles and 50 to 2 percent by weight of cationic cellulose pulp is fired to form ceramic articles. By the way, said percentages are represented on dry basis, and $\zeta$-potential of said cationic cellulose pulp is not less than +20 mV.

For the production of said particle sheet material of the invention, usual sheet forming machine, for example a paper making machine, may be employed as it stands, and any of additives other than said inorganic particles and said cationic pulp, for example, aluminum sulfate, latex emulsion, polymeric coagulating agent, emulsifying agent, surface active agent, binding agent and adhesive are not necessary. As the cellulose pulp which is previously cationated to a high degree is used in the present invention, the inorganic particles having a negative $\zeta$-potential can be fixed effectively, uniformly and with good yield to the substrate of said cationic cellulose pulp.

Each particle of the inorganic material does not form nodules and is separately adsorbed by said cationic cellulose pulp. Accordingly, the fine particles are adsorbed evenly and densely by the cationic cellulose pulp, and well sintered in the firing step.

In the present invention as disclosed in the above, 50 to 98 percent by weight of inorganic particles having a negative $\zeta$-potential in water and 50 to 2 percent by weight of cellulose pulp being previously cationated to higher than +20 mV in ζ-potential are mixed together in water, then a particle sheet material is formed from said aqueous mixture by using a sheet forming machine, and thus formed particle sheet material is fired in an oxidizing atmosphere to burn off the cellulose pulp component, thereby the inorganic fine particles are sintered together forming a ceramic article. In the method of the present invention, most of the particle sheet materials obtained from the sheet forming machine are wet; however, they may be fired after being dried, and a shaping step may be placed before or after said drying step. Accordingly, the ceramics made by the method of the present invention are not only flat plates but also wavy plates or corrugated plates.

In order to clarify the present invention, the process of the invention will be further explained by three steps, that is, (A) a step to form the cationic cellulose pulp, (B) a step to form the particle sheet material, and (C) a step to produce the ceramics of the invention by firing said particle sheet material.

A. Formation of Cationic Cellulose Pulp

The method to form the cationic cellulose pulp is, in short, a graft-copolymerization of cationic monomer to cellulose pulp.

The cationic monomers which may be used in the method of the present invention are exemplified in the following.

a. 2-hydroxy-3-methacryloyloxypropyltrimethylammonium chloride, structural formula:

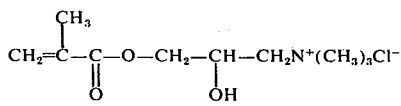

b. Vinylbenzyltrimethylammonium chloride, structural formula:

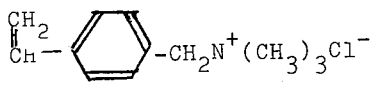

c. 3-acrylamidopropyl trimethylammonium chloride, structural formula:

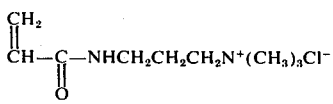

d. N-methylvinylpyridinium chloride, structural formula:

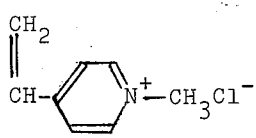

e. N-vinyl-2,3-dimethylimidazolinium chloride, structural formula:

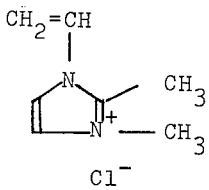

Now, the preparation of cationic cellulose pulp will be explained in the following on practical preparation tests. Starting materials:

Bleached kraft pulp of pine, freeness: 440 cc (Canadian Standard), and

Cationic monomer: 2-hydroxy-3-methacryloyloxypropyltrimethylammonium chloride (product of Nippon Oils And Fats Co., Ltd.).

Preparation A (Preparation of the cationic pulp in Test 2 of Table 1)

1. Pulp (32 g) was added to a four neck flask, and water was further added therein to form a pulp slurry of 2 % concentration. Then, nitrogen gas $N_2$ was introduced for 1 hour at 25°C with stirring.

2. An aqueous solution of ammonium ferrous sulfate $(FeSO_4.(NH_4)_2SO_4.6H_2O)$: 0.16g/4 ml-water was added as an initiator.

3. After 5 minutes, 25 g of the cationic monomer was added.

4. After further 5 minutes, 0.46 g of 30 % aqueous solution of $H_2O_2$ was added and stirring was continued for 2 hours.

5. After the 2 hours' stirring, hydroquinone was added as a polymerization inhibitor.

6. After the reaction, the pulp was rinsed sufficiently.

Preparation B (Preparation of the cationic pulp in Test 3 of Table 1)

1. Pulp (32 g) was added to a four neck flask, and water was further added therein to form a pulp slurry of 2 % concentration. Then, nitrogen gas $N_2$ was introduced for 1 hour at 25°C with stirring.

2. An aqueous solution of ammonium ceric nitrate $(Ce(NO_3)_4.2NH_4NO_3.2H_2O)$:13.9 g/250 ml-water was prepared, and 24 ml of said solution was added.

3. After 5 minutes, 32 g of cationic monomer was added, and the reaction was continued for 3 hours at 25°C.

4. Then, the reaction was stopped by adding hydroquinone.

5. After the reaction, the pulp was rinsed sufficiently.

In the above reactions, the cellulose pulp was radicalized by using the initiators of cerium (IV) salt and iron (II) salt. Then, the radicals of cellulose were attacked by the cationic monomer. This is the reaction mechanism of the cationizing treatment of the present invention.

The cationic cellulose pulp thus formed has ζ-potential of at least 20 mV, in some case, of more than 50 mV.

Thus obtained cationic cellulose pulps of 20 mV and 56 mV in ζ-potential were mixed with clay in water, respectively. Then, each particle sheet material was formed from each mixture by using a sheet forming machine, and the fixing ratio of clay was tested, the result of which is shown in the following Table 1

Table 1.

| Test Number | Cationic Pulp | pH of Slurry | Clay Content in Sheet (%) |
|---|---|---|---|
| 1 | Control * | 7.0 | 50.1 |
| 2 | Preparation A ($\zeta$-potential: +20mV) | 6.3 | 59.0 |
| 3 | Preparation B ($\zeta$-potential: +56mV) | 7.1 | 81.8 |

Notes:
1 Used pulp: Bleached kraft pulp of pine (Freeness: 440 cc; Canadian Standard)
2 Compound ratio of slurry, Pulp:Clay = 10:90
3 Basis weight of sheet material: 100 g/m²
* In the control (Test No. 1), only the ordinary pulp and clay are used and the cationic pulp was not used.

In view of the above table, it will be understood that, so as to adsorb a larger amount of the inorganic fine particles, the cationic cellulose pulp having a $\zeta$-potential of more than 20 mV is necessary.

B. Formation of Particle Sheet Material:

The process for forming the particle sheet materials of the present invention is substantially an application of the paper making technique in the conventional art. While, in the method of the present invention, the cationic pulp obtained through the above-mentioned process and inorganic fine particles having a negative $\zeta$-potential in water are used. Though the fine particles should be inorganic sinterable material, most of inorganic particles show negative $\zeta$-potentials in water, so that the materials for said fine particles may be easily selected in accordance with the kind of ceramics to be made.

That is, when ceramic wares are produced according to the present invention, any material or a mixture of materials selected from powders of clay, quartz, siliceous sand, china stone, feldspar, pyrophyllite, dolomite, limestone, kaolin etc. may be used as said inorganic fine particles.

Further, when refractories or ceramic articles for special purposes are produced according to the present invention, the inorganic fine particles may be one or more materials selected from powders of oxides (silica, alumina, zirconia, spinel, magnesia, beryllia etc.), silicate minerals (cordierite, forsterite, mullite etc.), carbides, nitrides and synthetic minerals of magnetic material and dielectric material.

Furthermore, in the present invention, 50 to 98 percent by weight of glaze powder containing or not containing frit and having a negative $\zeta$-potential in water, and 50 to 2 percent by weight of cationic cellulose pulp having +20 mV or larger $\zeta$-potential are mixed together in water, then a glaze particle sheet material is formed therefrom, said sheet material is placed on the surface of ceramic were or metallic plate, and such article is then fired in an oxidizing atmosphere to form a g glaze layer on the ceramic or metallic surface. Thereby, the glazing to ceramic or metallic surface can be performed according to the present invention. Further, by laminating the foregoing particle sheet material for ceramics and the latter glaze particle sheet material, and firing it in an oxidizing atmosphere, ceramic products with glazed surfaces can be advantageously produced. The components of the above-mentioned glaze may be represented by the following general formula:

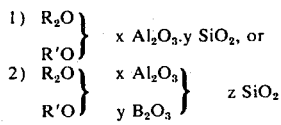

in which R is an alkali metal, R' is an alkaline earth metal, and numerals $x$, $y$ and $z$ can be determined arbitrarily.

As the inorganic fine particles show negative $\zeta$-potentials in water, so that any of these materials which having a sinterable property may be used for the process of the invention. The step for producing the particle sheet material itself is very simple. That is, 50 to 98 percent by weight of inorganic fine particles having a negative $\zeta$-potential and 50 to 2 percent by weight of the cationic cellulose pulp having a $\zeta$-potential of more than 20 mV are mixed together in water, and the sheet material is formed by using a sheet forming machine from said mixture. The particle size of said inorganic fine particles must be sufficiently small so as to be well dispersed in agitated water. In many cases, the particles are smaller than 200 mesh (TYLER standard sieve).

The particle sheet material formed through this process contains 50 to 98 percent by weight, as dry basis, of inorganic fine particles, and the remainder is cationic cellulose pulp. In general, the higher the $\zeta$-potential of cationic pulp is, the larger the content of particles becomes. Further, said particle sheet material in wet condition is considerably flexible, so that it can be advantageously shaped into desired forms.

C. Formation of Ceramics:

The method of firing to produce the ceramics from the particle sheet material is not so much different from the conventional firing method. However, in the present invention, the cellulose pulp contained in the particle sheet material is firstly burned off, and thereafter the component of fine particles is sintered to form ceramics. For such purpose, the former firing step is carried out in an oxidizing atmosphere. Before the particle sheet material from the sheet forming machine being set into a firing furnace, there may be provided with several preliminary arrangements and/or shaping step. So that, it is only an example that the particle sheet material after drying is directly fired. In many cases, the wet particle sheet materials are treated in a shaping step such as hot pressing or laminating of a plurality of sheet materials.

In short, there are four kinds of preliminary preparations or shaping steps, that is:

I. Drying the particle sheet materials from the sheet forming machine, and firing said sheet materials.

II. Shaping and drying the wet particle sheet materials from the sheet forming machine by using a hot press, and firing thus shaped sheet materials.

III. Drying the particle sheet materials from the sheet forming machine, putting in layers and pressing a plurality of said sheet materials, and firing the layers of sheet materials.

IV. Putting in layers a plurality of the wet particle sheet materials from the sheet forming machine, shaping and drying said layers of sheet materials by using a hot press, and firing the shaped sheet materials.

According to the method of the present invention, ceramic products of very large surface areas can be produced, and as a matter of course, a great variety of ceramic plates in their shapes and configurations can be formed. If desired, corrugated ceramic plates may be formed. Further, the ceramics may be made porous and light-weight; however, if the starting fine particles and each treatment step are properly selected, ceramics with high density may be produced.

According to the method of the present invention, several ceramic articles such as tiles, especially large tiles or corrugated tiles, refractories in several shapes, and ceramics for special uses can be produced.

In order that those skilled in the art may better understand the present invention and the manner in which it may be practised, the following specific examples are given, in which all parts and percents are by weight unless otherwise indicated.

EXAMPLE 1

Raw materials of 10 parts of highly cationic cellulose pulp ($\zeta$-potential: +56 mV) obtained in the aforementioned Preparation B, 25 parts of silica powder, 25 parts of feldspar powder and 50 parts of kaolin (clay) were mixed in water, and stirred well to obtain an aqueous slurry. Particle sheet materials were made through the ordinary paper making method, and said sheet materials in wet condition were put in layers to form a sheet of 4 mm in thickness. This sheet contained 88 % on dry basis of tile material (retention yield of inorganic particles: 80 %), and the body of tile could be produced by firing it in an oxidizing atmosphere to burn off the cellulose pulp component, and further firing to sinter said inorganic particles.

EXAMPLE 2

Raw materials of 10 parts of highly cationic cellulose pulp ($\zeta$-potential: +56 mV) obtained in the aforementioned Preparation B, 25 parts of silica powder, 25 parts of feldspar powder and 50 parts of kaolin (clay) were mixed in water, and stirred well to obtain an aqueous slurry. Then, particle sheet material of 4 mm in dried thickness was made through the odinary paper making method by using a sheet forming machine. This sheet material contained 88 % on dry basis of tile material (retention yield of inorganic particles: 80 %), and the body of tile could be produced by firing it in an oxidizing atmosphere to burn off the cellulose pulp component, and further firing to sinter said inorganic particles.

EXAMPLE 3

Raw materials of 10 parts of highly cationic cellulose pulp ($\zeta$-potential: +56 mV) obtained in the aforementioned Preparation B, 25 parts of silica powder, 25 parts of feldspar powder and 50 parts of kaolin (clay) were mixed in water, and stirred well to obtain an aqueous slurry. Then, particle sheet material of 4 mm in wet thickness was obtained through the ordinary paper making method by using a sheet forming machine. This sheet material was shaped and dried by a hot press at a temperature of 190°C and a pressure of 100 Kg/cm². This sheet material contained 88 % on dry basis of inorganic particles and a ceramic plate could be produced by firing it in an oxidizing atmosphere.

EXAMPLE 4

Raw materials of 10 parts of highly cationic cellulose pulp ($\zeta$-potential: +56 mV) obtained in the aforementioned Preparation B, 25 parts of silica powder, 25 parts of feldspar powder and 50 parts of kaolin (clay) were mixed in water, and stirred well to obtain an aqueous slurry. Then, particle sheet materials of about 0.3 mm in each thickness and containing 88 % of inorganic particles on dry basis, were made through the ordinary paper making method by using a sheet forming machine. Then, ten of those sheet materials were put in layers and pressed at a pressure of 30 Kg/cm² to obtain a layered sheet of 3 mm in thickness. By firing thus formed sheet, a thin ceramic plate could be produced.

EXAMPLE 5

Raw materials of 10 parts of highly cationic cellulose pulp ($\zeta$-potential: +56 mV) obtained in the aforementioned Preparation B, 25 parts of silica powder, 25 parts of feldspar powder and 50 parts of kaolin (clay) were mixed in water, and stirred well to obtain an aqueous slurry. Then, particle sheet materials of 0.3 mm in wet thickness were made through the ordinary paper making method by using a sheet forming machine. Ten of said sheet materials were put in layers, and shaped and dried by a hot press at a temperature of 200°C and a pressure of 120 Kg/cm². Said layered sheet contained 88 % of raw materials for ceramics on dry basis, and ceramic plate could be produced by firing it in an oxidizing atmosphere.

EXAMPLE 6

Raw materials of 7 parts of highly cationic cellulose pulp ($\zeta$-potential: +52 mV) obtained in the aforementioned Preparation A, 56 parts of silica powder, 28 parts of alumina powder and 33 parts of magnesite were mixed in water with stirring, and particle sheet materials having a thickness of 0.6 mm in wet condition were formed by using a sheet forming machine. Ten of said sheet materials were treated on a corrugated base plate by using a hot press at a temperature of 200°C and a pressure of 100 Kg/cm² to form a corrugated particle sheet material of 3 mm in thickness. Said corrugated particle sheet material contained 93 % of inorganic particles on dry basis. Then said sheet material was fired at a relatively lower temperature in an oxidizing atmosphere, thereafter the sheet material was further sintered at about Cone 10 (1300°C) to produce a corrugated refractory material.

EXAMPLE 7

Raw materials of 10 parts of cationic cellulose pulp ($\zeta$-potential: +36 mV) obtained in the aforementioned Preparation A, 25 parts of siliceous sand, 25 parts of feldspar powder and 50 parts of clay (kaolin) were suspended in water, thus the inorganic particles were adsorbed to the cationic cellulose pulp. Then, particle sheet materials of 0.3 mm in thickness and 50 cm × 50 cm in size were formed by a sheet forming machine, and ten of these sheet materials were put in layers and pressed to form a layered particle sheet material of 1.29 g/cm³ in density and 86 % in inorganic particle content on dry basis. In like manner as the foregoing Examples, a large sized plate of 47 cm × 47 cm was produced by firing the layered sheet material in an oxidizing atmosphere at a temperature of Cone 14 (1410°C) to Cone 16 (1460°C).

EXAMPLE 8

Into an aqueous suspension of 10 parts of cationic cellulose pulp obtained in the aforementioned Preparation B, 90 parts of ceramic glaze (comprising PbO, $Al_2O_3$, $SiO_2$, KNaO etc.) was added and stirred sufficiently. A particle sheet material of 0.6 mm in thickness and 670 g/m² in basis weight, was formed through the conventional method by using a Fourdrinier paper machine. This sheet material contained 87 % of glaze on dry basis, and the retention yield of said ceramic glaze was 73 %. Then, said sheet material was put on the surface of a body of tile and fired, thereby a glazed tile was produced.

EXAMPLE 9

Inorganic particles consisting of 90 parts of fritted glaze comprising lead oxide, boric acid, silica and alumina, and a small amount of red iron oxide ($Fe_2O_3$, inorganic red pigment), and 10 parts of cationic cellulose pulp ($\zeta$-potential: +20 mV) obtained in the aforementioned Preparation A were dispersed in water. Then, a glaze sheet material was formed through the conventional paper making process and hot press process. Thus obtained glaze sheet material was 2.5 mm in thickness, 3.08 kg/m² in basis weight, and 73 % in glaze content. Said glaze sheet material * consisting of 46 parts of clay, 25 parts of pyrophyllite 25 parts of china stone, 9 parts of limestone and 10 parts of cationic cellulose pulp, and fired together at about 1050°C to obtain a glazed ceramic plate.

EXAMPLE 10

A mixture of inorganic particles consisting of 39 parts of siliceous stone, 15 parts of feldspar, 9 parts of clay, 32 parts of kaolin and 3 parts of dolomite, and 10 parts of cationic cellulose pulp ($\zeta$-potential: +46 mV) obtained in the aforementioned Preparation B were suspended together in water, thereby the above inorganic particles were adsorbed by the cationic cellulose pulp. Particle sheet materials were formed from said suspension through the conventional sheet forming method. Each of the obtained sheet materials was 10.2 kg/m² in weight per unit area, 6.0 mm in thickness, 1 m × 1 m in size, 1.70 g/cm³ in density and 86 % in the content of inorganic particles. These sheet materials were fired in an oxidizing atmosphere to burn off the pulp component, thereafter the usual firing was caused at a temperature of about 1,330°C to produce large tiles without any distortion.

EXAMPLE 11

A small amount of red iron oxide ($Fe_2O_3$), 100 parts of ceramic glaze composition consisting of feldspar, lime, kaolin and quartz, and 10 parts of cationic cellulose pulp were suspended in water, and a glaze sheet material was formed from said suspension. The sheet material after the pressing and drying was 4.85 kg/m² in basis weight, 4.1 mm in thickness, 1.18 g/cm³ in density and 88 % in glaze content. A pattern was printed on said glaze sheet material by screen printing using a ceramic ink containing a spinel type inorganic pigment ($CoO.Cr_2O_3$) as the main component. This printed glaze sheet material was laid on the surface of a ceramic plate, and fired in an oxidizing atmosphere to burn off the pulp component, after that usual firing was carried out. Through the above steps, a ceramic plate with a patterned glaze layer was produced.

EXAMPLE 12

Three parts of cationic cellulose pulp ($\zeta$-potential: 56 mV) obtained in the aforementioned Preparation B and 97 parts of beryllium oxide (BeO) were dispersed in water, and particle sheet material was formed by using a sheet forming machine, thereafter the obtained sheet material was dried. The dried sheet material was 1 mm in thickness and contained 96 % of beryllium oxide. Then, the sheet material was shaped into desired configurations, and thus formed cut pieces were fired in an oxidizing atmosphere, and further sintered thereafter.

Thus obtained ceramic products were thin and lightweight, and advantageously used as insulating materials.

Though not shown with data in the above, the aforementioned percentages of 50 to 98 of inorganic fine particles and 50 to 2 of cellulose pulp are most preferable in the present invention. That is, when the inorganic fine particle is less than 50 percent by weight, the inorganic fine particle in the particle sheet material can not be sintered owing to the large existense of the cellulose pulp. In the meantime, when the inorganic fine particle is more than 98 percent by weight, the particle sheet material loses self-supporting property. It is preferred that from 75 to 98 percent by weight of said inorganic fine particles are thus employed.

From the above Examples, the features of the present invention will be understood, however, it should be emphasized that the specific embodiments described and shown herein are intended as merely illustrative and in no way restrictive of the invention.

What is claimed is:

1. A method for producing ceramics which comprises the steps of:
    forming an aqueous solution containing from about 50 to 98 percent by weight of inorganic particles having a negative $\zeta$-potential in water, said inorganic particles being selected from the group consisting of clay, quartz, siliceous sand, china stone, feldspar, pyrophyllite, dolomite, limestone, kaolin, sinterable powdered oxides, powered silicate materials, carbides, nitrides, synthetic minerals of magnetic and dielectic materials, and mixtures thereof, and from about 50 to 2 percent by weight of cationic cellulose pulp having a positive $\zeta$-potential of greater than about +20mV in water, said cationic cellulose pulp beign formed by the graft copolymerization of a cationic monomer to a cellulose pulp;
    forming a particle sheet material material from said aqueous solution of said inorganic particles and said cationic cellulose pulp in a sheet forming machine;
    heating said particle sheet material in an oxidizing atmosphere in order to burn off the cellulose pulp without sintering said inorganic particles; and
    further heating said particle sheet material at elevated temperatures in order to sinter said inorganic particles.

2. The method for producing ceramics in accordance with claim 1 in which said particle sheet material is shaped and dried in a hot press prior to said heating in said oxidizing atmosphere.

3. The method for producing ceramics in accordance with claim 1 in which said particle sheet material, subsequent to its formation in said sheet forming machine, is dried, and furthermore, wherein a plurality of said particle sheet materials are pressed into layered particle sheet materials prior to said heating in said oxidizing atmosphere.

4. The method for producing ceramics in accordance with claim 1 in which a plurality of said particle sheet materials are layered and furthermore, wherein said plurality of layers of particle sheet materials are shaped and dried as a unit in a hot press prior to said heating in said oxidizing atmosphere.

5. The method for producing ceramics in accordance with claim 1 in which the ζ-potential of said cationic cellulose pulp is greater than at least about +50mV in water.

6. The method for producing ceramics in accordance with claim 1 wherein said aqueous suspension includes from 75 to 98 percent by weight of said inorganic particles.

7. The method for producing ceramics in accordance with claim 1 wherein said inorganic particles are selected from the group consisting of glaze powders, and glaze powders containing frit.

8. A method of producing glazed ceramics which comprises the steps of:
  forming an aqueous suspension comprising from about 50 to 98 percent by weight of inorganic particles selected from the group consisting of clay, quartz, siliceous sand, china stone, feldspar, pyrophyllite, dolomite, limestone, kaolin and mixtures thereof, having a negative ζ-potential in water, and from about 50 to about 2 percent by weight of cationic cellulose pulp having a ζ-potential of greater than about +20mV in water,
  forming said suspension into a ceramic particle sheet material in a sheet forming machine;
  forming an aqueous suspension comprising from about 50 to 98 percent by weight of inorganic particles selected from the group consisting of glaze powders and glaze powders containing frit, having a negative
  -potential in water, and from about 50 to 2 percent by weight of cationic cellulose pulp having a potential of at least about +20mV in water;
  forming said aqueous suspension of glaze particles into a glazed particle sheet material in a sheet forming machine;
  forming a layer of said glazed particle sheet material on the surface of said ceramic particle sheet material;
  heating said ceramic particle sheet material including said layer of said glazed particle sheet material in a oxidizing atmosphere in order to burn off said cellulose pulp without sintering said inorganic particles; and
  further heating said ceramic particle sheet material including said glazed particle sheet material in order to sinter said inorganic particles and to glaze integrally thereon.

9. The method for producing glazed particle sheets which comprises the steps of;
  forming an aqueous suspension of a glazed particle sheet material comprising from about 50 to 98 percent by weight inorganic particles slected from the group consisting of glaze and glaze containing frit, having a negative ζ-potential in water and from about 50 to 2 percent by weight of cationic cellulose pulp having a ζ-potential of greater than about +20mV in water;
  forming said aqueous suspension into a glazed particle sheet material in a sheet forming machine;
  forming a layer of said glazed particle sheet material on the surface of an article selected from the group consisting of ceramic and metallic articles;
  heating said article including said layer of glazed particle sheet material in an oxidizing atmosphere in order to burn off the cellulose component without glazing said article; and
  further heating said article including said layer of said glazed particle sheet material so as to glaze said article.

* * * * *

UNITED STATES PATENT OFFICE
CERTIFICATE OF CORRECTION

Patent No. 3,962,389  Dated June 8, 1976

Inventor(s) Akira Takase, Mitsuo Suzuki, Yoichi Shiraki, Katsunori Horachi and Masao Anzai It is certified that error appears in the above-identified patent and that said Letters Patent are hereby corrected as shown below:

On Title Page, after "Assignee: Toppan Printing Co., Ltd., Tokyo, Japan", insert:

--Oji Paper Co., Ltd., Tokyo, Japan, and Yoichi Shiraki, Tokyo, Japan--

Signed and Sealed this

Twelfth Day of October 1976

[SEAL]

Attest:

RUTH C. MASON
*Attesting Officer*

C. MARSHALL DANN
*Commissioner of Patents and Trademarks*